Nov. 19, 1940.  S. A. STEVENS ET AL  2,222,049
APPARATUS FOR AMPLIFYING ALTERNATING OR PULSATING ELECTRIC CURRENTS
Filed Feb. 9, 1940

*INVENTORS*
*Sydney Arthur Stevens*
*and Alec Hervey Bennett Walker.*
BY
*Their Attorney.*

Patented Nov. 19, 1940

2,222,049

UNITED STATES PATENT OFFICE 2,222,049

APPARATUS FOR AMPLIFYING ALTERNATING OR PULSATING ELECTRIC CURRENTS

Sydney Arthur Stevens and Alec Hervey Bennett Walker, London, England, assignors, by mesne assignments to The Union Switch and Signal Company, Swissvale, Pa., a corporation of Pennsylvania Application February 9, 1940, Serial No. 318,188 In Great Britain November 23, 1938

5 Claims. (Cl. 179—171)

This invention relates to apparatus for amplifying alternating or pulsating electric currents and has for its object to provide improved apparatus of this character.

According to the invention a tuned oscillation circuit is arranged to be supplied with energy for maintaining its oscillation through a rectifier connected to a source of alternating current having a rising voltage-current or negative resistance characteristic, the current to be amplified being introduced into the tuned circuit and a corresponding amplified current being obtained from the circuit of the alternating current source as a modulation of the carrier wave of this circuit or as a pulsation from the tuned circuit or in any other suitable manner.

The invention thus consists broadly in providing an alternating current circuit having the special characteristics above referred to and from which a tuned circuit is supplied with rectified current, this latter circuit being caused to oscillate by the introduction of the current to be amplified, and by its oscillation producing an amplified output current.

In one form of the invention one or more inductances and condensers are connected in series across an alternating current supply circuit, a circuit including or inductively related to one or more of the series-connected elements in such a manner as to have a negative resistance characteristic being arranged to supply current through the rectifier to the tuned circuit, the current to be amplified being introduced into this tuned circuit and a corresponding amplified current being derived from one of the series connected elements as a modulation of a carrier wave of the alternating supply circuit frequency or as a pulsating current from the tuned circuit.

In another form of the invention the input circuit of the rectifier is connected to an alternating current supply circuit in series with the winding of a coke coil device provided with a saturating winding arranged to be supplied with rectifier current in such a manner as to cause the alternating current voltage impressed upon the input terminals of the rectifier to increase rapidly as the current increases, the current to be amplified being introduced into the tuned circuit as in the arrangement previously described.

Figure 1:
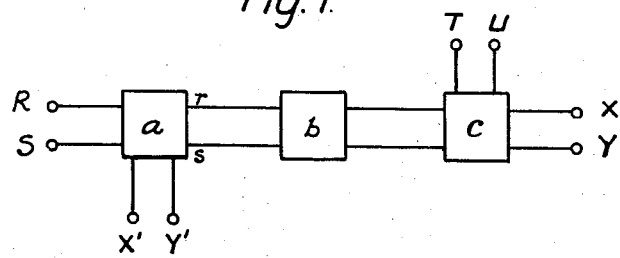
Figure 2:
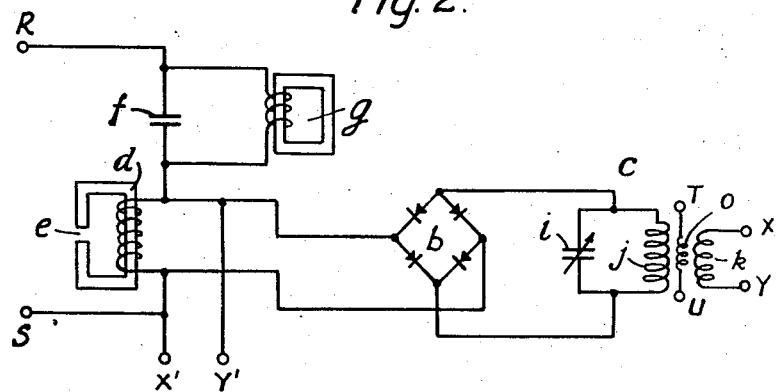
Figure 3:
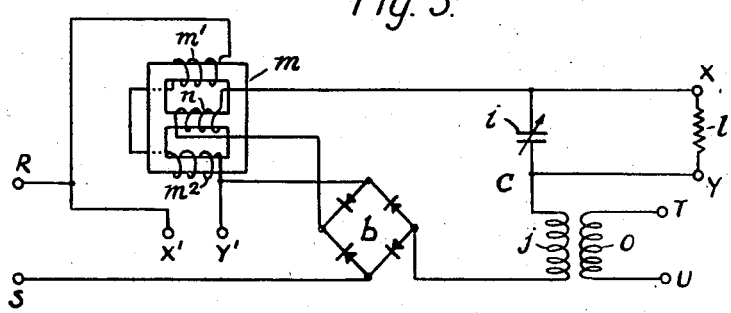

In order that the present invention may be readily understood, it will now be described more in detail with reference to the accompanying drawing of which Figure 1 is a schematic diagram illustrating the principle of the invention, and Figures 2 and 3 are circuit diagrams illustrating two forms of apparatus embodying the invention.

Referring to Figure 1, R and S are the terminals of an alternating-current supply circuit for supplying alternating current to a system $a$, which is an alternating current circuit adapted to supply alternating current from the terminals $r$ and $s$ in a manner equivalent to the supply from a source of alternating current having a negative internal resistance, and a tuned circuit $c$ is connected to the terminals $r$ and $s$ through a rectifier system $b$, while the oscillating current to be amplified is supplied to the tuned circuit through the input terminals T and U. Amplified oscillating current may be derived from the terminals X and Y provided in the tuned circuit $c$, or current comprising a carrier wave corresponding to the frequency of the alternating-current supply system modulated by the amplified oscillation wave may be derived from the system $a$ at X' Y'. It will be evident that with apparatus of this type various degrees of amplification may be obtained by selecting the system $a$ so as to constitute the equivalent of a negative resistance exceeding the resistance value of the tuned circuit by any desired amount smaller than the total resistance values of the input and output circuits for the oscillating current, while the utilisation of a system $a$ equivalent to a still more negative resistance value would result in the generation of a continuous oscillating current, the value of which would be independent of the value of the primary oscillating current supplied to the input terminals T and U.

In the form of apparatus illustrated in Figure 2 the supply terminals R and S are connected to a circuit comprising a non-saturated choke coil $d$ the iron core of which is provided with an air-gap $e$, and connected in series with a condenser $f$ to which a saturated choke coil $g$ is connected in parallel. The two terminals of the non-saturated choke coil $d$ are connected through the rectifier system $b$ which may be constituted for example by a Graetz system of four dry surface contact rectifiers to the tuned circuit $c$, which is illustrated as comprising an adjustable condenser $i$ connected in parallel with a reactance coil $j$. The input terminals T and U are connected to a coil $o$ which is inductively coupled with the coil $j$ of the tuned circuit $c$; while the terminals X, Y, of another coil $k$ which is also inductively coupled with the coil $j$ are utilised as output terminals for amplified oscillating current. Auxiliary output terminals X' and Y' are connected to the terminals of the non-saturated choke coil $d$ of the system $a$, and it will be evident that, as amplified oscillating current is derived from the terminals of the choke coil $d$ through the rectifier system $b$, the alternating current which is supplied by the terminals X' and Y', while having a carrier frequency corresponding to the frequency of the supply system will be modulated in accordance with the oscillation of the current supplied to the terminals T and U.

One way in which the negative resistance operating characteristic of the apparatus of Fig. 2 can be more clearly understood is to consider the parallel resonance effect of condenser $f$ and saturated choke $g$. Due to the presence of choke $g$, the resonance of this parallel circuit and therefore its impedance will depend upon the voltage effective across this circuit, that is, across the terminals of condenser $f$. This parallel circuit will, of course, have its maximum impedance when the condenser $f$ and choke $g$ are in parallel resonance, and will have a substantially lower impedance when the resonance is destroyed or decreased by a change in the inductance of choke $g$ brought about by a change in saturation due to a change in voltage. By properly proportioning the condenser $f$, saturated choke $g$, and non-saturated choke $d$, parallel resonance or maximum impedance can be made to occur at approximately the normal value of voltage existing across the supply terminals R—S. This results in a certain division of voltage between the parallel resonant circuit and the choke $d$. If now something is done which lowers the voltage across the resonant circuit, its impedance will drop sharply and more voltage can be made to appear across the terminals of choke $d$. Since the rectifier $b$ is in parallel with the choke $d$, a change in impedance of the rectifier circuit will disturb the voltage drop across choke $d$ and also the drop across the resonant circuit, throwing the latter out of resonance and sharply affecting its impedance. A change in the rectifier circuit impedance, as by introducing the current to be amplified into the winding T—U, can thus be made to cause a slight rise in the voltage drop across choke $d$, with the result that this rise is strongly reinforced by the action of the ferro-resonant circuit $f$—$g$ in going out of resonance. Similarly, a decrease of current in winding T—U will cause a correspondingly magnified decrease in the drop across choke $d$ due to the circuit $f$—$g$ again pulling wholly or partly into resonance. Accordingly, the changes of current in winding T—U are capable of being amplified by the apparatus and the circuit which supplies voltage to the rectifier behaves as though it had a negative internal resistance.

In the form of apparatus illustrated in Figure 3, the input terminals of the rectifier system $b$ are connected across the supply terminals R and S in series with the windings $m^1$, $m^2$ of a choke coil device $m$ having a three-limbed core arranged to be saturated by means of a winding $n$ in accordance with the direct current supplied by the rectifier system $b$. As owing to this saturation the reactance of the windings $m^1$ $m^2$ of the choke coil device $m$ will decrease when the current supplied by the rectifier system is increased, it will be evident that the voltage applied to the input terminals of the rectifier system will correspondingly increase, thus being equivalent to the voltage supplied by a source of alternating current having a negative internal resistance. The tuned circuit $c$ is illustrated as comprising an adjustable condenser $i$ and a reactance coil $j$ connected in series across the rectifier input terminals in series with the winding $n$, a primary oscillation being arranged to be induced in the coil $j$ by means of a coil $o$ which is inductively coupled with the coil $j$ and the terminals of which are connected to the input terminals TU. Amplified oscillating current is supplied to a load $l$ from the output terminals X and Y which are connected across the condenser $i$ of the tuned circuit $c$, and current having a carrier frequency corresponding to the frequency of the supply system and modulated in accordance with the oscillations induced by the coil $o$ may be derived from the auxiliary output terminals X' and Y'.

In each of the forms of apparatus described it will, of course, be sufficient to provide either the output terminals X and Y or the auxiliary output terminals X' and Y' if modulated current of the frequency of the supply system or pure amplified oscillating current is not required, respectively.

Other arrangements than those described above may be adopted for energising the tuned circuit so as to enable this circuit to oscillate when a current to be amplified is introduced, to produce the action above described, and the invention is not limited for this purpose to the particular arrangements or connections of the circuit elements as above described.

Having now particularly described and ascertained the nature of our said invention and in what manner the same is to be performed, we declare that what we claim is:

1. Apparatus for amplifying alternating or pulsating electric currents comprising in combination, a source of alternating current, a circuit deriving current from said source and having a negative resistance-voltage characteristic, a rectifier, means for impressing the voltage of said source across the terminals of said rectifier, a tuned circuit connected across the output terminals of said rectifier, and means for introducing the current to be amplified into said tuned circuit to thereby cause the tuned circuit to oscillate and thereby produce an amplified current therein.

2. Apparatus for the production of modulated electric oscillations comprising in combination, a source of alternating current of given frequency, a circuit deriving current from said source and having a negative resistance-voltage characteristic, a rectifier, means for impressing the voltage of said source across the input terminals of said rectifier, a tuned circuit connected across the output terminals of said rectifier, and means for introducing a periodic current into said tuned circuit to cause oscillation thereof, whereby current of said given frequency modulated at the frequency of said periodic current is obtainable by connecting a load with said first mentioned circuit.

3. Apparatus for amplifying alternating or pulsating electric currents comprising in combination, a source of alternating current having a negative resistance-voltage characteristic, a rectifier having its input terminals connected to receive energy from said source, a tuned circuit connected across the output terminals of said rectifier, and means for introducing the current to be amplified into said tuned circuit to cause oscillation thereof and thereby produce an amplified current in said tuned circuit.

4. Apparatus for amplifying alternating or pulsating electric currents comprising in combination, a source of alternating current, a condenser and a choke coil connected in series across said source, said choke coil being so designed that its core is incapable of becoming saturated, a magnetically saturable choke coil connected across said condenser, the parts being proportioned in such manner that the circuit of said non-saturated choke coil exhibits a negative resistance-voltage characteristic, a rectifier having its input terminals energized from said circuit, a tuned circuit connected across the output terminals of said rectifier, and a circuit for introducing the current to be amplified into said tuned circuit to cause oscillation thereof and thereby produce an amplified current in said tuned circuit.

5. Apparatus for amplifying alternating or pulsating electric current comprising in combination, a source of alternating current, a saturable choke having an impedance winding and a saturating winding, a rectifier having its input terminals connected across said source in series with said impedance winding, a tuned circuit connected across the output circuit of said rectifier in series with said saturating winding, means for introducing the current to be amplified into said tuned circuit to cause oscillation thereof and thereby produce an amplified current in said tuned circuit, and a load connected across an element of said tuned circuit to receive said amplified current.

SYDNEY ARTHUR STEVENS.
ALEC HERVEY BENNETT WALKER.